US007949643B2

(12) United States Patent
Kawale et al.

(10) Patent No.: US 7,949,643 B2
(45) Date of Patent: May 24, 2011

(54) METHOD AND APPARATUS FOR RATING USER GENERATED CONTENT IN SEARCH RESULTS

(75) Inventors: Jaya Kawale, Bangalore (IN); Aditya Pal, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 427 days.

(21) Appl. No.: 12/111,257

(22) Filed: Apr. 29, 2008

(65) Prior Publication Data
US 2009/0271391 A1  Oct. 29, 2009

(51) Int. Cl.
*G06F 17/30* (2006.01)
(52) U.S. Cl. ........ 707/706; 707/708; 707/722; 707/723; 707/724; 707/726; 707/727; 707/728; 707/729; 707/730; 707/731; 707/748; 707/750; 707/751
(58) Field of Classification Search .................. 707/722, 707/723, 724, 725, 726, 727, 728, 729, 730, 707/731, 999.005, 706, 708, 748, 750, 751; 705/14, 14.6, 347
See application file for complete search history.

(56) References Cited

U.S. PATENT DOCUMENTS

| | | | | |
|---|---|---|---|---|
| 6,285,999 | B1 * | 9/2001 | Page | 1/1 |
| 7,031,961 | B2 * | 4/2006 | Pitkow et al. | 1/1 |
| 7,269,587 | B1 * | 9/2007 | Page | 1/1 |
| 7,447,678 | B2 * | 11/2008 | Taylor et al. | 1/1 |
| 7,617,200 | B2 * | 11/2009 | Budzik et al. | 1/1 |
| 7,627,565 | B2 * | 12/2009 | Budzik et al. | 1/1 |
| 7,676,520 | B2 * | 3/2010 | Liu et al. | 707/748 |
| 7,783,645 | B2 * | 8/2010 | Hess et al. | 707/751 |
| 7,818,315 | B2 * | 10/2010 | Cucerzan et al. | 707/723 |
| 2006/0004717 | A1 * | 1/2006 | Ramarathnam et al. | 707/3 |
| 2006/0074910 | A1 * | 4/2006 | Yun et al. | 707/7 |
| 2006/0235810 | A1 * | 10/2006 | Wen et al. | 706/12 |
| 2007/0027830 | A1 * | 2/2007 | Simons et al. | 707/1 |
| 2007/0078884 | A1 * | 4/2007 | Ott et al. | 707/102 |
| 2007/0112768 | A1 * | 5/2007 | Majumder | 707/7 |
| 2007/0130126 | A1 * | 6/2007 | Lucovsky et al. | 707/3 |
| 2007/0185865 | A1 * | 8/2007 | Budzik et al. | 707/5 |
| 2007/0214131 | A1 * | 9/2007 | Cucerzan et al. | 707/5 |
| 2008/0059453 | A1 * | 3/2008 | Laderman | 707/5 |
| 2008/0077570 | A1 * | 3/2008 | Tang et al. | 707/5 |
| 2008/0132251 | A1 * | 6/2008 | Altman et al. | 455/457 |
| 2008/0140643 | A1 * | 6/2008 | Ismalon | 707/5 |
| 2008/0201348 | A1 * | 8/2008 | Edmonds et al. | 707/101 |
| 2008/0208911 | A1 * | 8/2008 | Lee et al. | 707/104.1 |
| 2008/0228759 | A1 * | 9/2008 | Maruhashi et al. | 707/5 |
| 2008/0243830 | A1 * | 10/2008 | Abhyanker | 707/5 |
| 2009/0006434 | A1 * | 1/2009 | Fowler et al. | 707/101 |
| 2009/0049033 | A1 * | 2/2009 | Sedov | 707/5 |
| 2009/0063449 | A1 * | 3/2009 | van Zwol | 707/5 |

(Continued)

*Primary Examiner* — Don Wong
*Assistant Examiner* — Thanh-Ha Dang
(74) *Attorney, Agent, or Firm* — Seth H. Ostrow; Ostrow Kaufman LLP (57) ABSTRACT

Generally, a method and apparatus provides for rating user generated content (UGC) with respect to search engine results. The method and apparatus includes recognizing a UGC data field collected from a web document located at a web location. The method and apparatus calculates: a document goodness factor for the web document; an author rank for an author of the UGC data field; and a location rank for web location. The method and apparatus thereby generates a rating factor for the UGC field based on the document goodness factor, the author rank and the location rank. The method and apparatus also outputs a search result that includes the UGC data field positioned in the search results based on the rating factor.

17 Claims, 4 Drawing Sheets

U.S. PATENT DOCUMENTS

| | | | |
|---|---|---|---|
| 2009/0119693 A1* | 5/2009 | Higgins et al. | 725/9 |
| 2009/0125511 A1* | 5/2009 | Kumar | 707/5 |
| 2009/0169178 A1* | 7/2009 | Higgins et al. | 386/124 |
| 2009/0239552 A1* | 9/2009 | Churchill et al. | 455/456.3 |
| 2009/0240576 A1* | 9/2009 | Rothrock et al. | 705/14 |
| 2009/0241040 A1* | 9/2009 | Mattila et al. | 715/760 |
| 2009/0259499 A1* | 10/2009 | Bhojwani et al. | 705/7 |
| 2009/0271283 A1* | 10/2009 | Fosnacht et al. | 705/26 |
| 2010/0114862 A1* | 5/2010 | Young et al. | 707/709 |
| 2010/0268701 A1* | 10/2010 | Zhang et al. | 707/709 |

* cited by examiner

| S.No. | Attribute | Intuitive Weight |
|---|---|---|
| 1 | User rating (if available) | High |
| 2 | Frequency of posts before and after the document is posted | High |
| 3 | Document's contextual affinity with parent document, root of thread, subject. | High |
| 4 | No. of page clicks/views for the document (if available) | Medium |
| 5 | Assets in documents such as *images, links, videos* and *embedded objects* | Medium |
| 6 | Length of the document | Medium |
| 7 | Length of thread in which document lies | Low |
| 8 | Goodness of child documents (if any) | Low |

FIG. 4

| S.No. | Attribute | Intuitive Weight |
|---|---|---|
| 1 | No of relevant/irrelevant messages posted | High |
| 2 | Document goodness of all the documents initiated by the author | High |
| 3 | Total no. of documents initiated (root documents) posted by the author in recent times (author activity) | Medium |
| 5 | Total number of replies, comments made by author | Low |
| 6 | No of groups the author is a member of | Low |

FIG. 5

| S.No. | Attribute | Intuitive Weight |
|---|---|---|
| 1 | Activity rate in the forum (No of documents posted per hour) | High |
| 2 | No. of unique users in the forum | High |
| 3 | Average Document goodness of documents posted in the board | High |
| 4 | Average author rank of the users in the board | High |
| 5 | External rank of the forum | Medium |

METHOD AND APPARATUS FOR RATING USER GENERATED CONTENT IN SEARCH RESULTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates web-based searching techniques and more specifically to the inclusion of user generated content in the search results of the web-based searching operations.

BACKGROUND OF THE INVENTION

User Generated Content ("UGC") is content that end-users publish on the Internet, e.g., in the form of blogs, groups, public mailing lists, Q & A services, product reviews, message boards, forums and podcasts, among other types of content. The UGC is available at any number of web locations that allow for users to enter this information. Some web locations are well known UGC-based sites, such as "Wikis" or forums or chat rooms, for example. In utilizing the Internet, UGC is media content that is typically publicly available and produced by end-users, which can be relevant to searching results requested using web-based search engines.

There are existing, but limited, search engines providing searching to UGC-specific web locations. For example, the Google Blog search is a specialized search exclusively on blog data. Another example is Yahoo message board search which specializes on message board data. But these are specialized search engines for UGC-only content.

There are many well-known existing web searching techniques, where these techniques perform searching operations relating to searching general web content, where the general web content does not necessarily include user generated content. Rather, the existing searching techniques typically quantify a more static collection of web-based data at various data locations for the search operations. Based on the exclusion of UGC from search results, the results generated by the existing searching engines are missing relevant information in the results.

Along with the increase in volume of UGC available on the Internet at various web locations, UGC has become a vast collection of rich information. There are a number of queries which classic web searches cannot adequately address. For example, information about digital cameras can be found on respective company websites, but consumer feedback about these products (and services), such as the "zoom freezes sometimes when the flash is on", comes from the end users themselves. A list of restaurants in San Francisco can be found on the web with a lot of meta-data associated with each restaurant. Opinion queries, however, such as the "best Chinese restaurant", cannot be answered without involving the users.

Typical ranking mechanisms for ranking of a document in a web search, however, are unsuitable for ranking UGC. UGC are fairly short, they generally do not have links to or from them (rendering the back-link based analysis unhelpful) and spelling mistakes are quite common. Improving search experience for users by leveraging UGC is therefore beneficial.

It thus improves search results to be able to utilize such content, analyze it and to leverage both algorithmic techniques and social interactions to identify relevant information, thereby providing good searches across such content. Accordingly, there exists a need for providing search results that include UGC and for rating the UGC with respect to search results that the search engine generates.

SUMMARY OF THE INVENTION

Generally, a method, apparatus and computer program product provides for rating user generated content ("UGC") with respect to search engine results. The method and apparatus includes recognizing a UGC data field collected from a web document located at a web location. The method, apparatus and computer program product calculates: a document goodness factor for the web document; an author rank for an author of the UGC data field; and a location rank for web location. The method, apparatus and computer program product thereby generate a rating factor for the UGC field on the basis of the document goodness factor, the author rank and the location rank. A search result is output that includes the UGC data field positioned in the search results based on the rating factor.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration exemplary embodiments in which the invention may be practiced. It is to be understood that other embodiments may be utilized and structural changes may be made without departing from the scope of the present invention.

Figure 1:
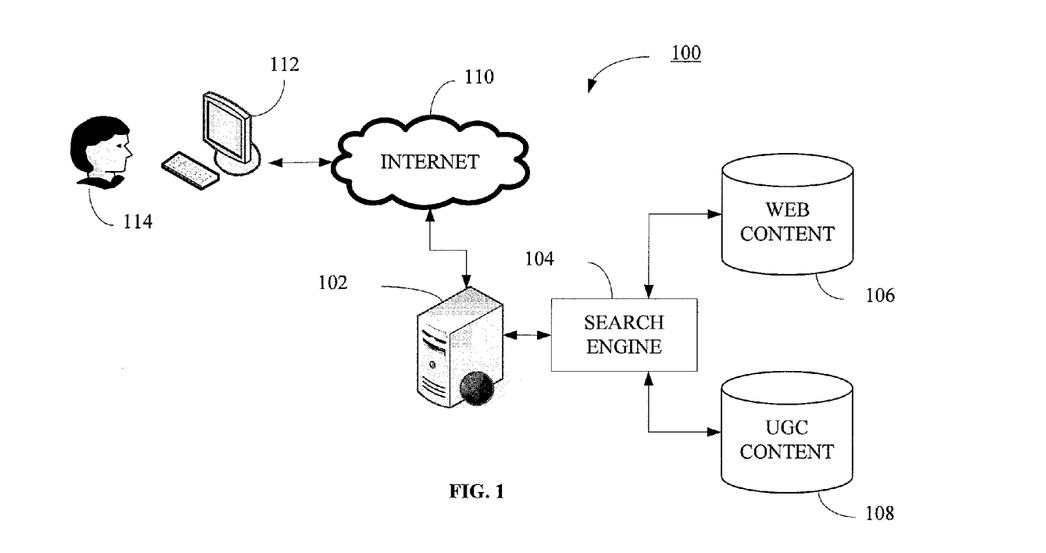
FIG. 1 illustrates a block diagram of a processing environment that includes an apparatus for generating search results that include rating user generated content according to one embodiment of the present invention.

FIG. 1 illustrates a system 100 including a web server 102 in communication with a search engine 104 and databases for maintaining web content 106 and UGC content 108. The system 100 further includes a network 110, such as the Internet, a user computer 112 and a user 114.

The web server 102 may be any suitable type of server including processing operations allowing the user 114 to access the server 102 via the network 110 for the performance of various operations, including a search operation. The search engine 104 may be processing operations performed by one or more processing devices, wherein the processing operations include operations described herein relating to rating of user generated content with respect to search results. The operations of the search engine may be performed in response to executable instructions, wherein in one embodiment those instructions may be received from any suitable computer readable medium.

The databases 106 and 108 may be one or more data storage devices having information stored therein. It is recognized that the databases 106 and 108 may be illustrated as a single data storage unit, but for clarity purposes, the database 106 is illustrated as storing static or general web content and the database 108 stores user generated content, as described in further detail below.

The Internet 110 may be any suitable network connection as recognized by one skilled in the art, the user computer 112 may also be any suitable type of computing device operative to communicate with the server 102 via the Internet 110 and operative to receive user input, for example a search request, from the user 114.

Figure 2:
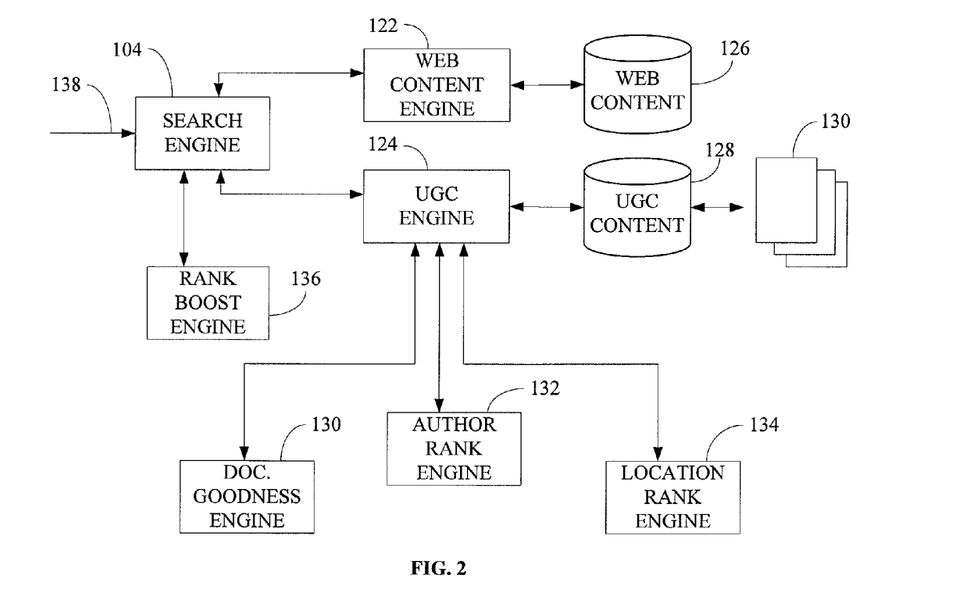
FIG. 2 illustrates a block diagram of one embodiment of an apparatus for rating user generated content with respect to search results generated by a search engine.

The search engine 104 is operative to perform processing operations for rating UGC with respect to search results generated therein, wherein FIG. 2 illustrates a more detailed description of the search engine 104 processing environment and operations. According to FIG. 2, the search engine 104 is in communication with a web content engine 122 and a UGC engine 124. The web content engine 122 is coupled to a web content database 126 and the UGC engine 124 is coupled to a UGC database 128 or any other suitable type of storage device having UGC content 130 either stored thereon or accessible therefrom.

The UGC engine 124 is further in communication with a document goodness factor engine 130, an author rank engine 132 and a location rank engine 134. In one embodiment, the search engine 104 is further in communication with a rank boosting engine 136.

The engines 104, 122, 124, 130, 132, 134 and 136 may be one or more processing devices operative to perform processing operations in response to executable instructions. Any suitable computer readable medium may provide these instructions such that the engines 104, 122, 124, 130, 132, 134 and 136 are operative to perform processing operations as described in greater detail below. The web content database 126 may be one or more data storage devices having standard or existing web content information stored therein, such as information usable by known searching techniques. Examples of the content in the database 126 may be static, non-UGC content, as recognized by one skilled in the art. By contrast, the database 128 stores or provides access to the UGC 130 found at various web locations. The UGC 130 stored in the database 128 may already be normalized to account for disparate formatting at various web locations, the normalization being performed using any suitable normalization technique known to those of skill in the art.

In the search engine 104 of FIG. 2, the search engine 104 receives a search request 138. With respect to FIG. 1, this search request may be received from the user 114, via the user's computer 112, transmitted to the web server 102 via the Internet 110 (or other suitable network). The web server 102 may perform suitable processing operations and forward the search request 138 to the search engine 104. The search engine 104, in response to the search request 138, may perform known searching operations using the web content engine 122 accessing the web content database 126. As noted above, the web content engine 122 does not account for UGC, therefore the search engine 104 additionally accesses the UGC engine 124 to conduct searching operations with respect to the UGC 130. The methodology of performing the searching and rating UGC is described additionally with respect to the flowchart of FIG. 3.

Figure 3:
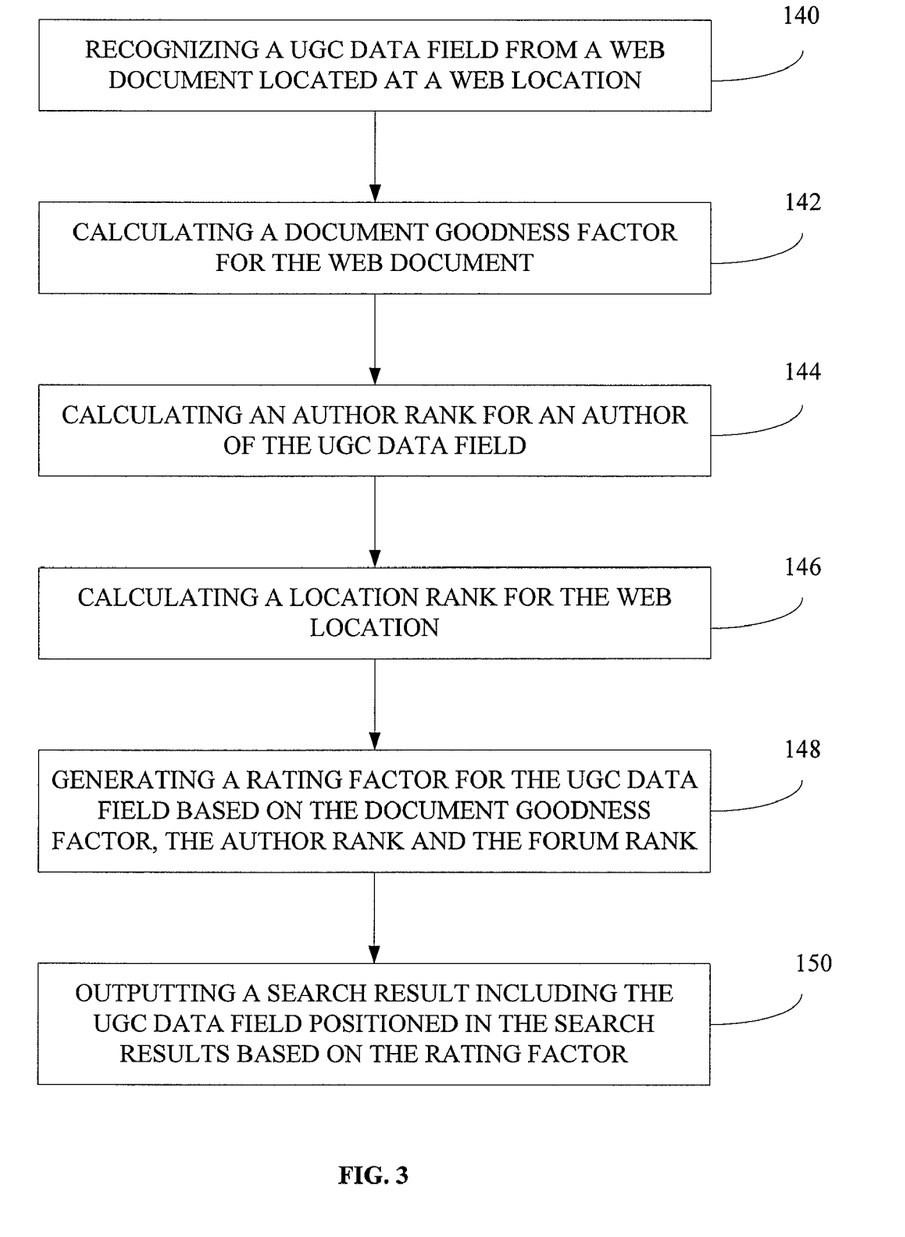
FIG. 3 illustrates a flowchart of a method for rating user generated content with respect to search results generated by a search engine according to one embodiment of the present invention.

FIG. 3 illustrates a flowchart of the steps of one embodiment of a method for rating UGC with respect to search results generated by a search engine. The method includes a first step, step 140, recognizing a UGC data field from a web document located at a web location. With respect to FIG. 2, this includes the UGC engine 124 accessing the UGC database 128 to recognize the UGC data fields that have been collected from the documents 130, where the data fields are associated with the search request 138.

In this embodiment, a next step, step 142, is calculating a document goodness factor for the web document. With respect of FIG. 2, this document goodness factor may be calculated using the document goodness engine 130. A document goodness factor is a measure of how good a document is on the basis of its representative attributes. These attributes may include presentational aspects of a document, such as length, links, images and popularity aspects of the document, such as ratings, views, activity in group after the post, etc. The calculating of a document goodness factor may include the application of a weighting value to the attributes and calculating the factor based on these weights.

Figure 4:
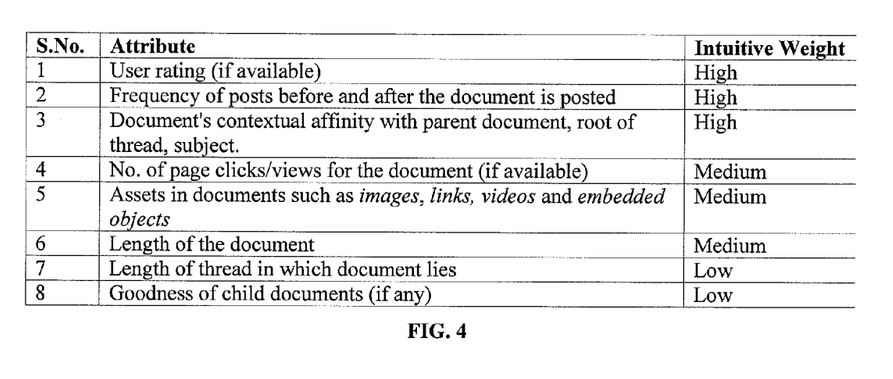
FIG. 4 illustrates a table of one embodiment of document attributes usable for determining a document goodness factor.

By way of example, FIG. 4 illustrates a sample table of attributes for document goodness. The exemplary attributes include: user rating (if available); frequency of posts before and after a document is posted; document's contextual affinity with a parent document, root of thread or subject; a number of page clicks/views for the document (if available); assets in the documents such as images, links, videos and embedded objects; length of the document; length of thread in which document lies; and goodness of child documents (if any). The attributes include a weight, in this example being high, medium or low. Accordingly, a review of the web document based on the noted attributes may provide elements or values for computing the document goodness factor.

Referring back to FIG. 3, a next step, step 144, is calculating an author rank for an author of the UGC data field. With respect to FIG. 2, this author rank may be calculated using the author rank engine 132. The author rank is a measure of the expertise of the author in a given area. An author publishing good documents with high frequency, attracting lots of replies may receive a high rating. Also, an author who has more points or one who has good knowledge of the subject as judged on the basis of the quality of posts made and replies those posts fetch, may similarly receive a higher ranking.

Figure 5:
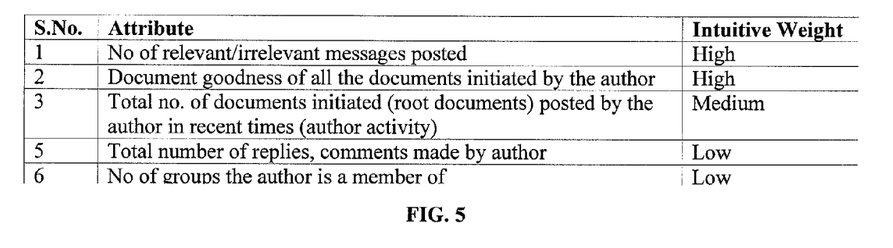
FIG. 5 illustrates a table of one embodiment of author rank attributes usable for determining an author rank factor.

FIG. 5 illustrates an exemplary table of author rank attributes. The exemplary attributes include: a number of relevant/irrelevant messages posted; document goodness of all documents initiated by the author; total number of documents initiated posted by the author within a defined time period; total number of replies or comments made by the author; and a number of groups to which the author is a member. The attributes include a weight, in this example being high, medium or low. According to one embodiment, a review of the author on the basis of the noted attributes provides elements for calculating the author rank for the author of the UGC data field.

With reference back to FIG. 3, a next step, step 146, is calculating a location rank for the web location. With regards to FIG. 2, this location rank may be calculated using the location rank engine 134. The web location rank relates to a particular rank of the web location itself. The web location may include a user online board, a group, a forum or any suitable web location allowing for the entrance and posting of UGC.

Figure 6:
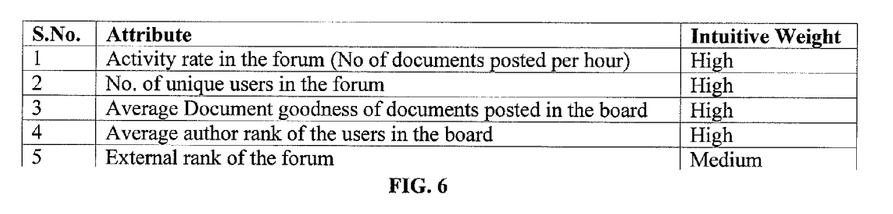
FIG. 6 illustrates a table of one embodiment of forum rank attributes usable for determining a forum rank factor.

FIG. 6 illustrates an exemplary table of web location rank attributes. In this embodiment, the attributes may include: an activity rate in the web location, for example a number of documents posted per hour; a number of unique users in the web location; an average document goodness factor for the documents in the web location; an average author rank of the users in the web location; and an external rank of the web location. The attributes include a weight, in the example being high, medium or low. Accordingly, a review of the web location based on the noted attributes can provide elements for calculating the web location rank for the web location having the UGC data field.

With reference back to FIG. 3, a next step, step 148, is generating a rating factor for the UGC data field based on the document goodness factor, the author rank and the forum rank. One embodiment includes a simplistic aggregation technique for combining these factor and ranks. One step includes normalizing the factor and ranks to a same scale, for example they may be normalized over a probability distribution of the documents over a sample space. For example, one embodiment may include using an arctan conversion technique. For example, to calculate document goodness, the attributes may be normalized to a score in the range of 0-1, and then the goodness factor is determined by Equation 1 as follows $$\text{goodness}(d) = \Sigma(\text{weight}_{\{i\}} * \text{score}_{\{i\}}) / \Sigma(\text{weight}_{\{i\}})$$   Equation 1:

In one embodiment, the combination of the document goodness factor, the author rank and the web location factor may be done by direct combination. Another embodiment may include supervised learning, which may include setting weighting values on the basis of one or more tests over a sample of queries and expected results. The weighting factors may be adjusted on the basis of user feedback, evaluation techniques or any other form of learning operations known to those of skill in the art.

In the flowchart of FIG. 3, a final step in accordance with the present embodiment comprises outputting a search result that includes the UGC data field positioned in the search results on the basis of the rating factor. With respect to FIG. 2, this may include operations performed by the search engine 104 to combine search results from the UGC engine 124 and the web content engine 122. The search results may then be provided back to the user 114 via the Internet 110 as illustrated in FIG. 1.

It is further noted that the flowchart of FIG. 3 refers to a single UGC data field, but it is understood that the rating of the UGC refers to large quantities of UGC. The attributes for the document goodness factor, author rank and web location rank are determined for these various applicable UGC data fields and the UGC engine 124 generates a collection of UGC search results, which may be included in a search results output. It is also recognized that UGC search results may be included in a UGC-specific search result output.

An additional embodiment includes a dynamic boosting of the ranking of UGC search results. According to this additional embodiment, as the user inputs a search query, the underlying search engine may use TF/IDF and document ranking to fetch N most relevant documents, where N is any suitable integer value. Each document falls under some root category, for example sports, movies, software, etc. The dynamic boosting of ranking gives a higher priority to categories having more results.

Dynamic rank boost is based on the understanding that the user's query intent is closer to the category with a higher number of results. For example, if users are posting frequently about apple in the context of fruit, then it is more likely that a user searching for apple is actually searching for the fruit apple. So if for a query "apple," the search results may get 5 results from "software" category and ten results from "fruit" category. Thus, the results from the fruit category are more preferred. At the same time, the category software is not penalized heavily for not being popular.

Figure 7:
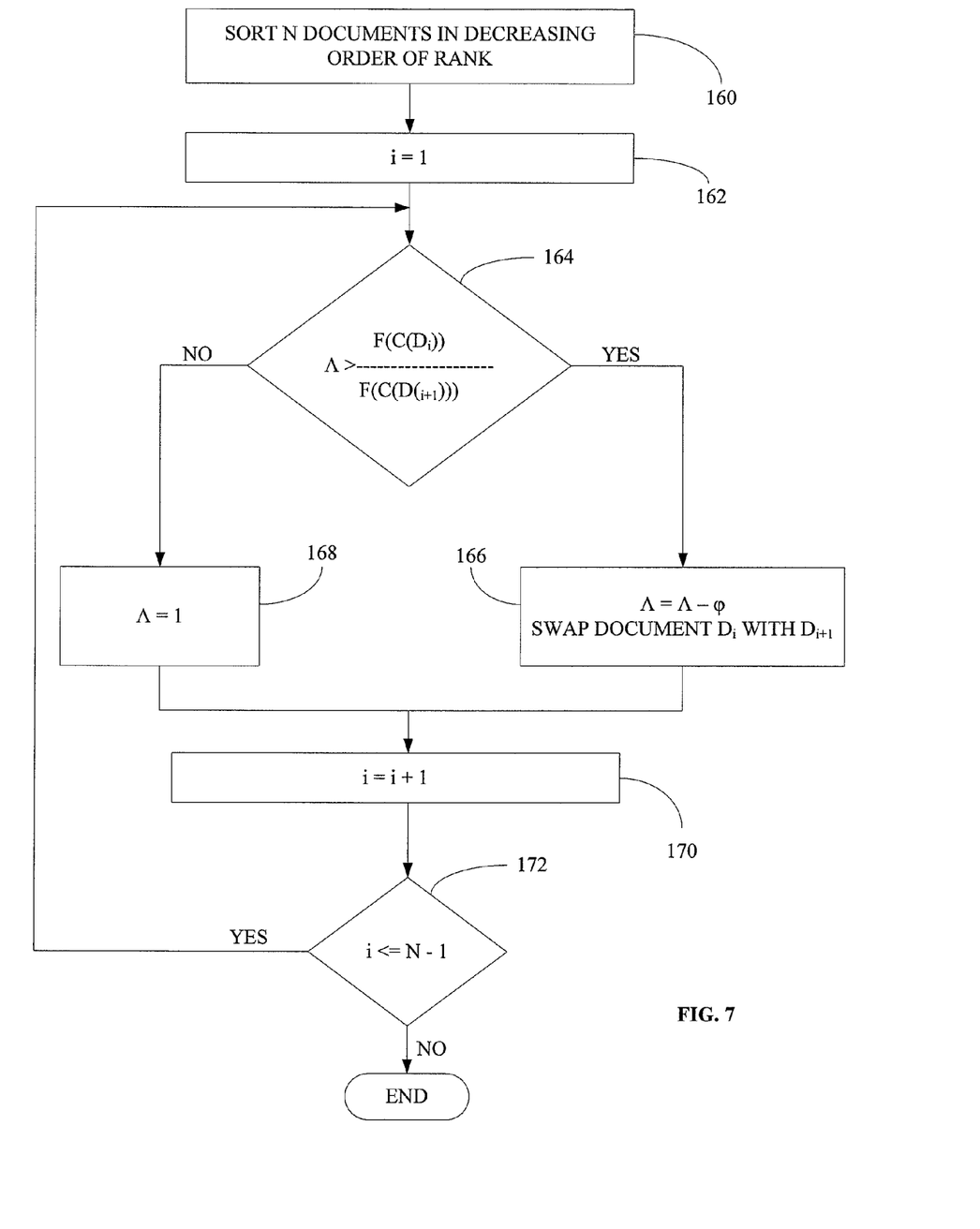
FIG. 7 illustrates a flowchart of a method for dynamically boosting rank applied to the user generated content search results according to one embodiment of the present invention.

FIG. 7 illustrates a flowchart of a method for boosting the rank of UGC search results according to one embodiment of the present invention. The algorithm bubbles up the results from the more popular category without heavily penalizing less popular categories with the use of a damping factor, $\phi$.

In the flowchart of FIG. 7, a first step, step 160, is to sort the N documents in decreasing order of the document rank. For example, the documents may be denoted by $D_1, D_2, \ldots, D_N$. In this embodiment, suppose that N documents fall into M categories, $C_1, C_2, \ldots, C_M$, such that, $F_i$ documents belong to category $C_i$. It is further noted that $\Sigma F_i = N$.

In running the frequency algorithm, let $F_i$ be the frequency of category i and let $F(C(D_i))$ be the frequency of the category of document i.

Max=max($F_1, F_2, \ldots F_M$)

Min=min($F_1, F_2, \ldots, F_M$).

$\phi$=(Max−Min)/N (Theta is also called as damping factor)

$\lambda$=1 (Lambda is also called as cutoff factor).

In step 162, the value i is made equal to 1. In step 164, a determination is made if $\lambda$ is greater than $F(C(D_i))$ divided by $F(C(D_{i+1}))$. If the answer to step 164 is in the affirmative, $\lambda$ is defined as being equal to $\lambda$-$\phi$ and the operation swaps documents $D_i$ with $D_{i+1}$, step 166. If the answer to step 164 is in the negative, $\lambda$ is set as being equal to 1, step 168.

After either step 166 or step 168, the method proceeds to step 170, wherein the value of i is incremented by one. In step 172, it is determined if the value of i is less than or equal to N−1. If yes, the method reverts to step 164 and repeats. The method iterates steps 164, 166 or 168, and 170 until the answer to the inquiry in step 172 indicates that i is not longer less than N−1 and whereupon the method ends.

Accordingly, using the above-described method and apparatus, search engine results include UGC. The UGC may be processed to be effectively integrated into existing web search results or may be presented as separate search results. The UGC is processed to account to document goodness, author rank and location rank, whereby when processing the UGC, the search results include relevancy and effectiveness is presenting the UGC content in a usable format to the searcher.

FIGS. 1 through 7 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms memory and/or storage device may be used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for ranking web documents including user generated content (UGC) with respect to search results generated by a search engine, the search results comprising a set of web documents belonging to a plurality of root categories, the method comprising:

recognizing a UGC data field collected from a web document located at a web location, the web document belonging to at least one root category of the plurality of root categories;

calculating a document goodness factor for the web document, the document goodness factor measuring overall quality of the web document;

calculating an author rank for an author of the UGC data field;

calculating a web location rank for the web location;

generating a rating factor for the UGC data field based on the document goodness factor, the author rank and the web location rank;

boosting the web document in a search result set of web documents to a higher ranking above another web document based on the at least one root category that the web document belongs having more web documents in the result set belonging thereto than the another of the web document in the search set while applying a damping factor in determining whether to boost the web document, the damping factor minimizes penalizing the another web document in the result set as a result of belonging to a root category having less web documents in the result set than the web document, wherein the damping factor is a function of a difference between a number of documents in a first category and a number of documents in a second category divided by a total number of documents in at least the first and the second categories; and outputting a search result including the UGC data field positioned in the search results based on the rating factor and the damping factor.

2. The method of claim 1, further comprising:

normalizing the document goodness factor, the author rank and the web location rank; and generating the rating factor for the UGC data field by combining the normalized document goodness factor, the normalized author rank and the normalized web location rank.

3. The method of claim 2, wherein the generation of the rating factor includes supervised learning.

4. The method of claim 1, wherein the document goodness factor is based on document attributes, the document attributes including at least one of: a user rating; a frequency of posts before and after the document is posted; a document's contextual affinity with a parent document; a page click/view number for the document; assets in the document; document length; length of a thread in which the document lies; and goodness of a child document.

5. The method of claim 1, wherein the author rank is based on author rank attributes, the author rank attributes including at least one of: a number of relevant posted messages; a number of irrelevant posted messages; a total number of root documents post by the author within a prescribed time period; a total number of replies or comments made by the author; and a number of groups to which the author is a member.

6. The method of claim 1, wherein the web location rank is based on location rank attributes, the location rank attributes including at least one of: an activity rate in the web location; a number of unique users in the web location; an average document goodness factor of documents in the web location; an average author rank of users in the web location; and an external rank of the web location.

7. An apparatus for ranking web documents including user generated content (UGC) with respect to search results generated by a search engine, the search results comprising a set of web documents belonging to a plurality of root categories, the apparatus comprising:
- a computer readable medium having executable instructions stored thereon; and
- a processing device, in response to the executable instructions, operative to:
  - recognize a UGC data field collected from a web document located at a web location, the web document belonging to at least one root category of the plurality of root categories;
  - calculate a document goodness factor for the web document, the document goodness factor measuring overall quality of the web document;
  - calculate an author rank for an author of the UGC data field;
  - calculate a web location rank for the web location;
  - generate a rating factor for the UGC data field based on the document goodness factor, the author rank and the web location rank;
  - boosting the web document in a search result set of web documents to a higher ranking above another web document based on the at least one root category that the web document belongs having more web documents in the result set belonging thereto than the another of the web document in the search set while applying a damping factor in determining whether to boost the web document, the damping factor minimizes penalizing the another web document in the result set as a result of belonging to a root category having less web documents in the result set than the web document, wherein the damping factor is a function of a difference between a number of documents in a first category and a number of documents in a second category divided by a total number of documents in at least the first and the second categories; and
  - output a search result including the UGC data field positioned in the search results based on the rating factor and the damping factor.

8. The apparatus of claim 7, the processing device, in response to the executable instructions, is further operative to:
- normalize the document goodness factor, the author rank and the web location rank; and
- generate the rating factor for the UGC data field by combining the normalized document goodness factor, the normalized author rank and the normalized web location rank.

9. The apparatus of claim 8, wherein the generation of the rating factor includes supervised learning.

10. The apparatus of claim 7, wherein the document goodness factor is based on document attributes, the document attributes including at least one of: a user rating; a frequency of posts before and after the document is posted; a document's contextual affinity with a parent document; a page click/view number for the document; assets in the document; document length; length of a thread in which the document lies; and goodness of a child document.

11. The apparatus of claim 7, wherein the author rank is based on author rank attributes, the author rank attributes including at least one of: a number of relevant posted messages; a number of irrelevant posted messages; a total number of root documents post by the author within a prescribed time period; a total number of replies or comments made by the author; and a number of groups to which the author is a member.

12. The apparatus of claim 7, wherein the web location rank is based on location rank attributes, the location rank attributes including at least one of: an activity rate in the web location; a number of unique users in the web location; an average document goodness factor of documents in the web location; an average author rank of users in the web location; and an external rank of the web location.

13. A computer readable medium having executable instructions stored thereon, when read by a processing device, the executable instructions provide a method for ranking web documents including user generated content (UGC) with respect to search results generated by a search engine, the search results comprising a set of web documents belonging to a plurality of root categories, the method comprising:
- recognizing a UGC data field collected from a web document located at a web location, the web document belonging to at least one root category of the plurality of root categories;
- calculating a document goodness factor for the web document, the document goodness factor measuring overall quality of the web document;
- calculating an author rank for an author of the UGC data field;
- calculating a web location rank for the web location;
- generating a rating factor for the UGC data field based on the document goodness factor, the author rank and the web location rank;
- boosting the web document in a search result set of web documents to a higher ranking above another web document based on the at least one root category that the web document belongs having more web documents in the result set belonging thereto than the another of the web document in the search set while applying a damping factor in determining whether to boost the web document, the damping factor minimizes penalizing the another web document in the result set as a result of belonging to a root category having less web documents in the result set than the web document, wherein the damping factor is a function of a difference between a number of documents in a first category and a number of documents in a second category divided by a total number of documents in at least the first and the second categories; and
- outputting a search result including the UGC data field positioned in the search results based on the rating factor and the damping factor.

14. The computer readable medium of claim 13, where the method further includes:
- normalizing the document goodness factor, the author rank and the web location rank; and
- generating the rating factor for the UGC data field by combining the normalized document goodness factor, the normalized author rank and the normalized web location rank.

15. The computer readable medium of claim 13, wherein the document goodness factor is based on document attributes, the document attributes including at least one of: a user rating; a frequency of posts before and after the document is posted; a document's contextual affinity with a parent document; a page click/view number for the document; assets in the document; document length; length of a thread in which the document lies; and goodness of a child document.

16. The computer readable medium of claim 13, wherein the author rank is based on author rank attributes, the author rank attributes including at least one of: a number of relevant posted messages; a number of irrelevant posted messages; a total number of root documents post by the author within a prescribed time period; a total number of replies or comments made by the author; and a number of groups to which the author is a member.

17. The computer readable medium of claim 13, wherein the web location rank is based on location rank attributes, the location rank attributes including at least one of: an activity rate in the web location; a number of unique users in the web location; an average document goodness factor of documents in the web location; an average author rank of users in the web location; and an external rank of the web location.

* * * * *